May 2, 1950      E. A. NORDBERG      2,506,314
METHOD AND APPARATUS FOR FORMING CAPACITOR BODIES
Filed April 7, 1945      6 Sheets-Sheet 1
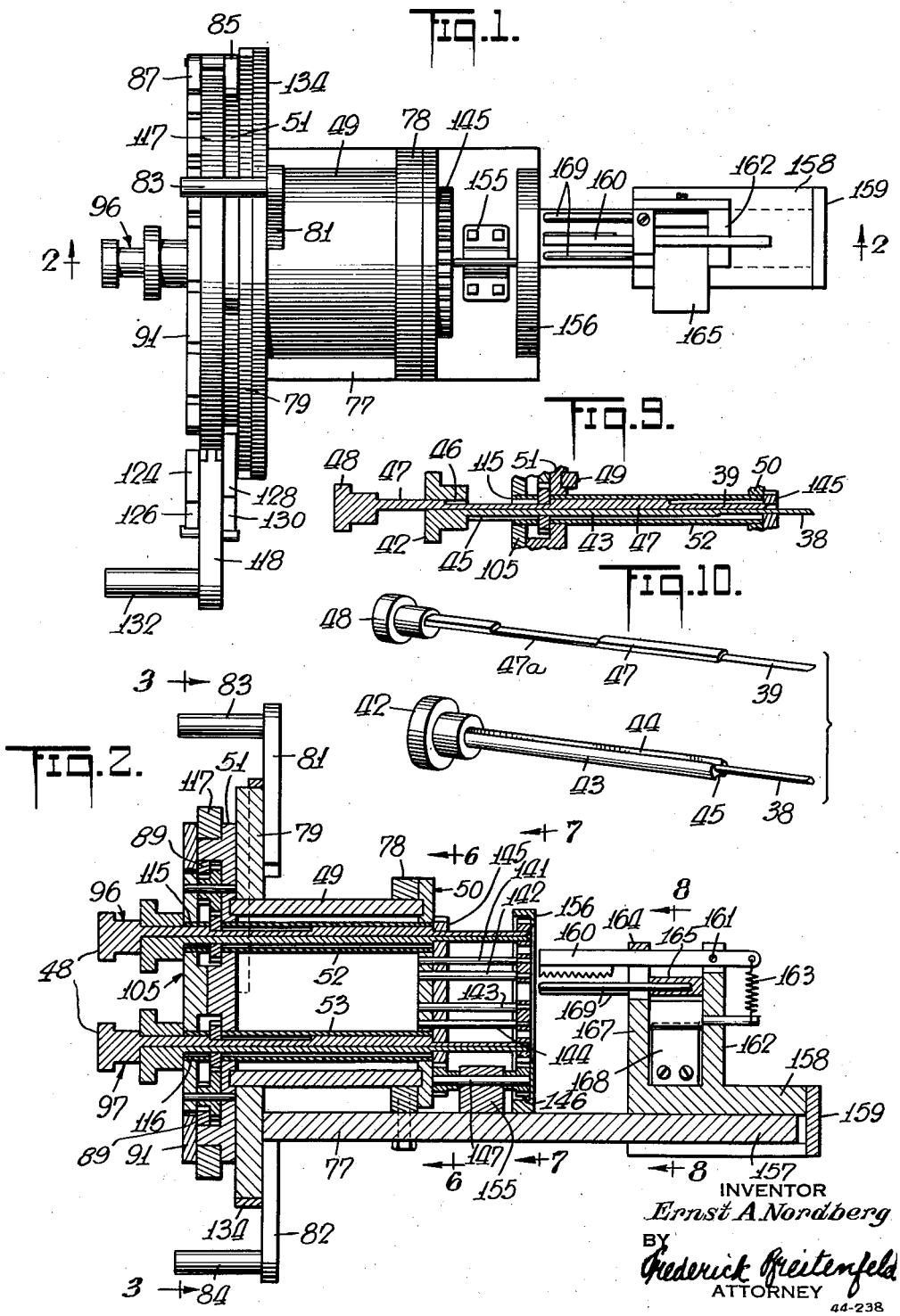
INVENTOR
Ernst A. Nordberg
BY Frederick Breitenfeld
ATTORNEY

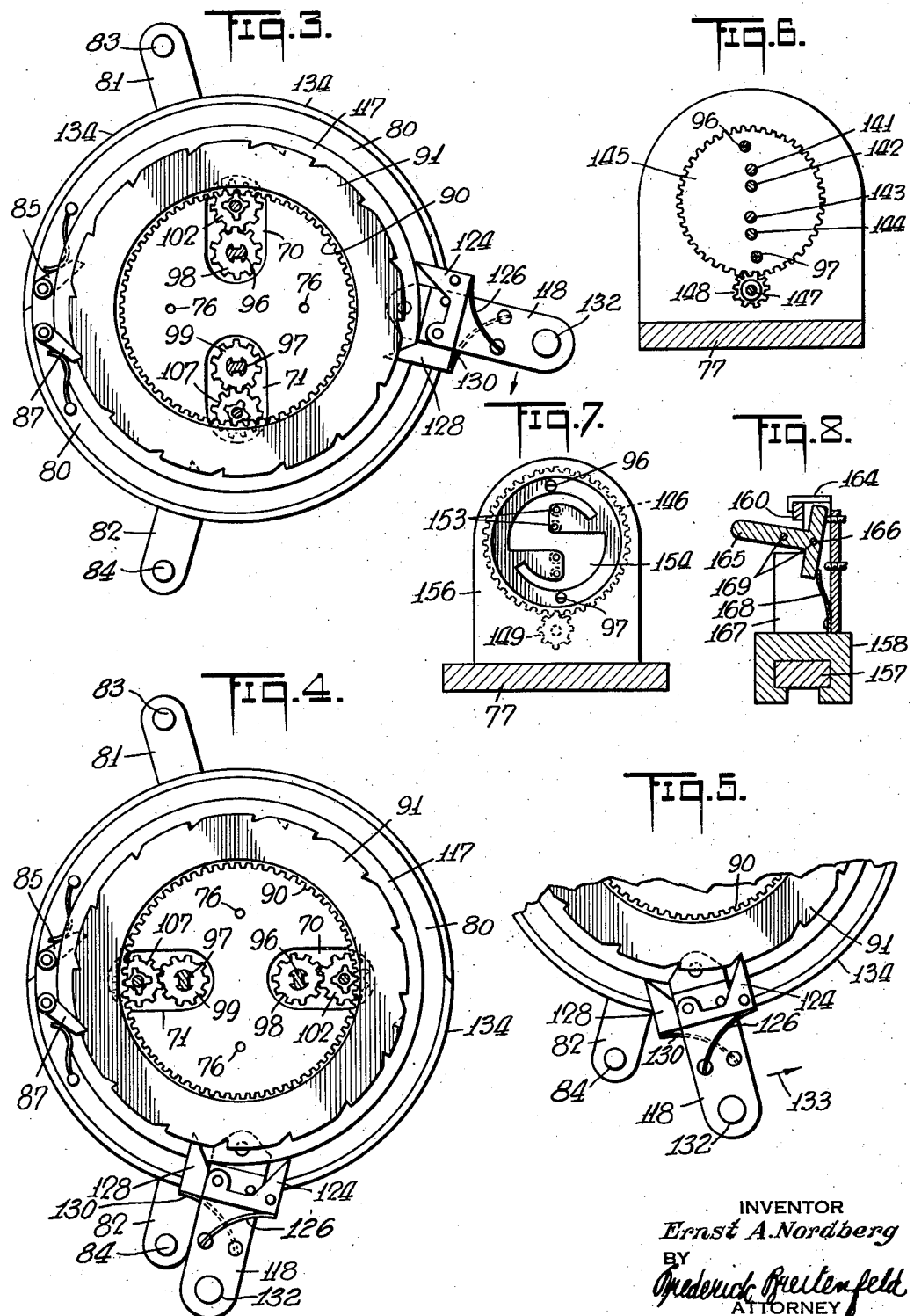

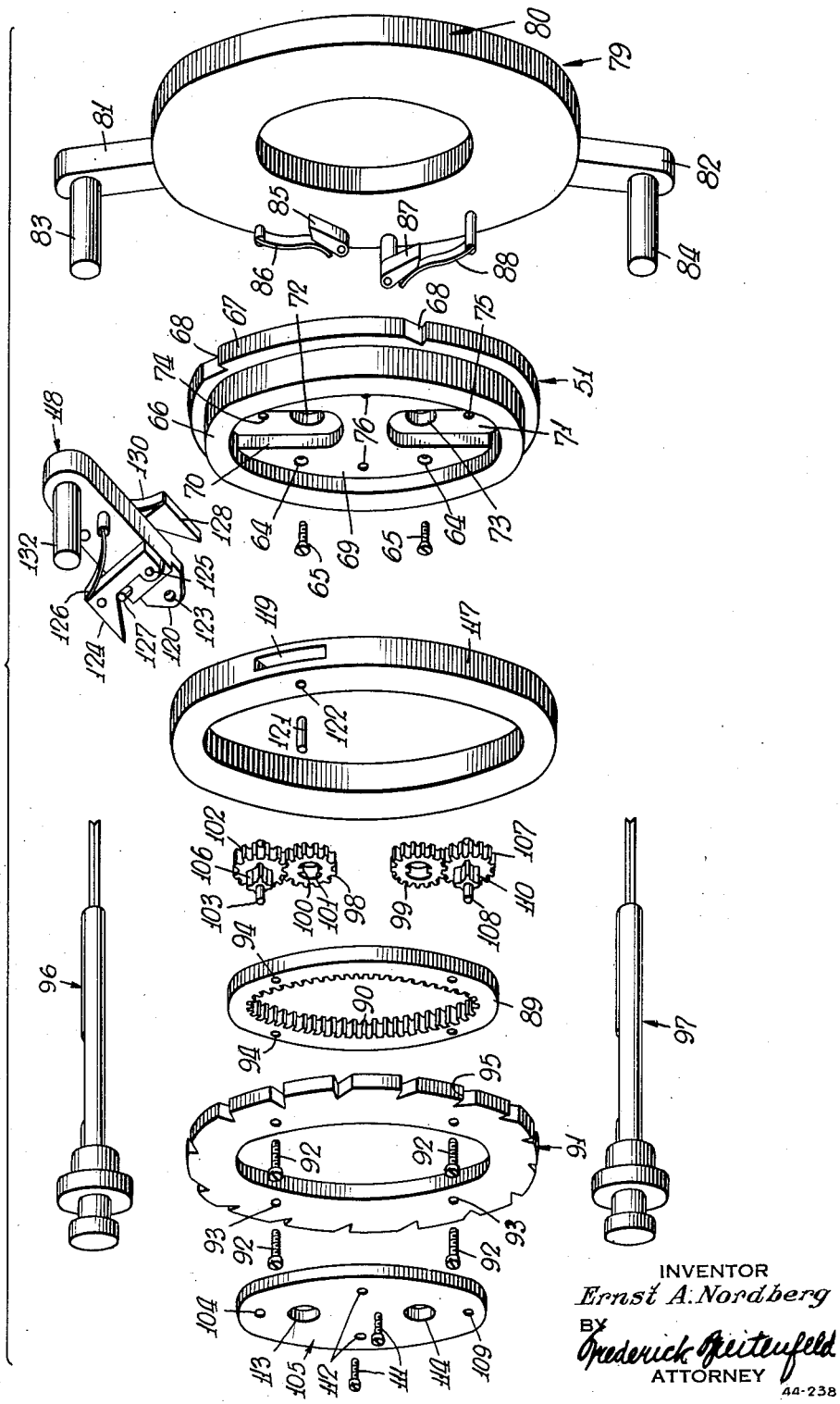

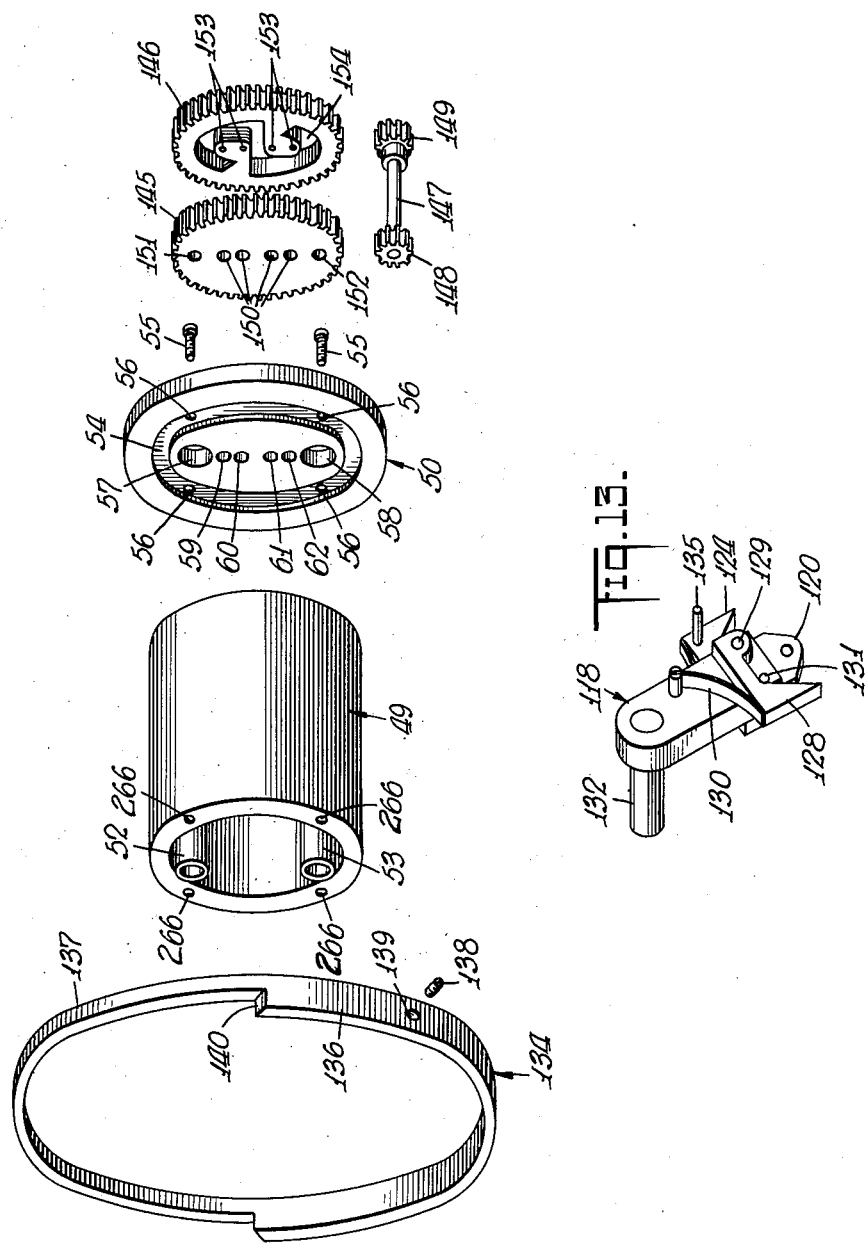

May 2, 1950 E. A. NORDBERG 2,506,314
METHOD AND APPARATUS FOR FORMING CAPACITOR BODIES
Filed April 7, 1945 6 Sheets-Sheet 5
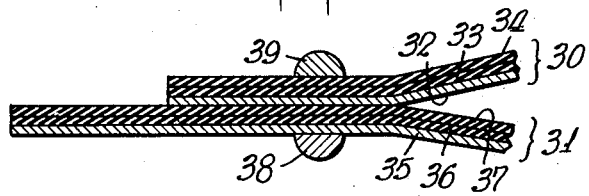
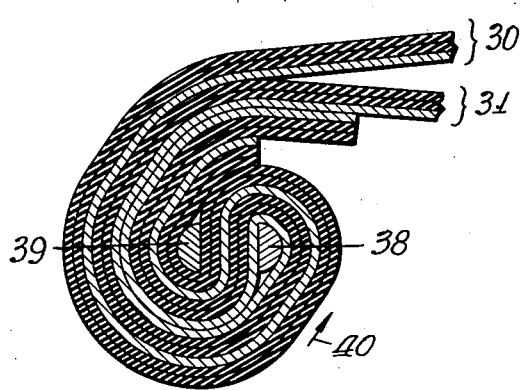
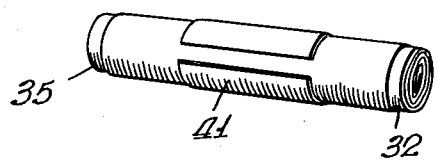
INVENTOR
Ernst A. Nordberg
BY
Frederick Breitenfeld
ATTORNEY
44-238

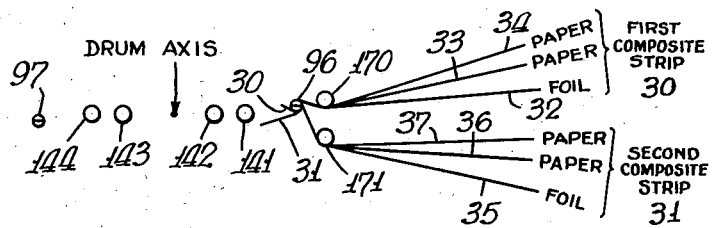

Patented May 2, 1950

2,506,314

UNITED STATES PATENT OFFICE 2,506,314

METHOD AND APPARATUS FOR FORMING CAPACITOR BODIES

Ernst A. Nordberg, Southport, Conn.

Application April 7, 1945, Serial No. 587,048

21 Claims. (Cl. 242—56)

My present invention relates generally to capacitor bodies, and has particular reference to the formation of such bodies by the suitable interwinding of alternate conducting and insulating layers of material.

The general objects of my invention include the provision of a new and simplified procedure to be followed in bringing certain strips into properly interwound relation, the provision of a new apparatus by means of which capacitor bodies may be formed in an unusually efficient and reliable manner, and the production of a wound capacitor body of improved character.

The general type of wound body to which my invention is primarily directed is well known, and in its simplest form it consists essentially of two strips of thin metallic foil or the like coiled together in spiral fashion, with layers of thin paper or equivalent insulating material interposed between them, whereby the foils are adapted to serve as mutually insulated condenser plates of extended area.

It will be understood that the terms "foil" and "paper" as used herein, while alluding to the usual materials employed, are intended to include within their significance any equivalent kinds of conducting and insulating materials, respectively.

It has been the usual practice to sandwich each foil layer between two layers of paper, and to prolong the latter for shielding purposes beyond the ends of the interposed foil. This imposes a difficulty, however, in commercial production, since the cutting of the various layers as they emanate from continuous supply reels must be independently performed for the paper and the foil, thus calling for specialized and relatively complex apparatus or for extra manual labor, or both.

It is well recognized that the simplest cutting operation, whether performed manually or automatically, consists in a severance of all layers, both foil and paper, at the same time and place, whereby only a single stroke of a single knife or cutter is involved. I have heretofore suggested a method and apparatus involving a simple cutting procedure of this kind, the necessary insulation being achieved by dividing the severed ends into two groups and threading them in opposite directions, i. e., in opposed relation, into engagement with the mandrel upon which the coiled body is to be wound.

I have now devised a procedure and apparatus by means of which I am enabled not only to utilize a single cutting operation for all layers, but to obviate the necessity for directing the severed ends into opposed directions before threading them into engagement with the winding mandrel. The desired condition of mutual insulation between the foils is achieved by superposing the various contacting and insulating layers in a special relationship, and by causing one group of layers, which includes one of the foils, to project longitudinally at its ends beyond another group of layers which includes the other foil.

In order to explain the features of my invention more conveniently, I shall hereinafter refer to these two groups as two "composite strips" because in the performance of the present improved procedure, and in the functioning of the new apparatus, each of these two groups is treated as though it were actually a single unitary strip. As the term "composite" implies, however, each composite strip is composed of two layers, an insulating layer and a conducting layer. These layers have their ends in alignment at all times. Although it may be feasible to combine or laminate the layers into permanent association before utilizing the composite result, it is more in compliance with existing practice to withdraw the layers separately from individual supply reels or the like, one or more supply reels of paper being used conjointly with a supply reel of foil. Obviously, while the insulating layer of each composite strip may consist of a single ply of paper, it is better practice, from an insulating standpoint, to employ two or more paper plies in superposed relation, and the term "insulating layer" is to be understood as including within its scope a layer of paper consisting of one, two, or more individual plies.

Briefly stated, the advantages achieved by my present invention reside not only in an ability to utilize a simple cutting instrumentality in a single operation, and in the simplicity involved in having the composite strips facing in the same direction at all times, but also in the simplified procedures, the improved features of machine design and operation, and the enhanced qualities of the new capacitor bodies themselves, which stem directly from the foregoing.

The capacitor body resulting from the present invention is characterized by the employment of two composite strips each of which comprises an insulating layer and a conducting layer with their ends in alignment, the strips being superposed with the insulating layer of one strip in contact with the conducting layer of the other, the former having its ends projecting longitudinally beyond the ends of the latter, the longer strip having its inner end doubled back to envelop the shorter end, and the body being wound in the form of a spiral with the shorter strip on the outside.

The procedure is characterized by the engagement of the strip ends with a rotatable mandrel upon which the coiled body is wound, by a subsequent engagement of the strips between the two parts of a second mandrel of split construction, and by severance of the strips in the region between the two mandrels whereby the desired inequalities in length, both on the almost-completed wound body on the first mandrel, and at the commencement of winding of a new body on the second mandrel, are automatically achieved.

The preferred embodiment of the apparatus comprises a supply station from which the two composite strips emanate, a first and second mandrel each of which is rotatable on its axis to wind said strips thereon and thereby form the coiled capacitor body, a drum on which the mandrels are mounted with their axes parallel to but on opposite sides of the drum axis, whereby rotation of the drum on its axis will move the mandrels through arcuate paths to permit them to change places successively, and a cutting instrumentality operable in a special manner at predetermined times to effect the desired severance of the strips.

I achieve the foregoing general objects and advantages, and such other objects and advantages as may hereinafter appear or be pointed out, in the manner illustratively exemplified in the accompanying drawings, in which:

Figure 1 is a plan view of an apparatus constructed in accordance with the present invention;

Figure 2 is an elevational cross-sectional view taken substantially along the line 2—2 of Figure 1;

Figure 3 is a cross-sectional view taken substantially along the line 3—3 of Figure 2, showing the parts in the relationships they assume at one stage of the operation;

Figure 4 is a view similar to Figure 3 showing the parts in the relationships they assume during a different stage of operation;

Figure 5 is a fragmentary view similar to Figure 4 with the operating handle swung to commence a new winding operation;

Figure 6 is a cross-sectional view taken substantially along the line 6—6 of Figure 2;

Figure 7 is a cross-sectional view taken substantially along the line 7—7 of Figure 2;

Figure 8 is a cross-sectional view taken substantially along the line 8—8 of Figure 2;

Figure 9 is a longitudinal cross-sectional view through one of the split mandrels and certain parts of the apparatus which support it;

Figure 10 is an exploded view of the two parts of one of the split mandrels;

Figure 11 is an exploded view showing a number of the component parts of the apparatus;

Figure 12 is an exploded view constituting a continuation of the array of component parts shown in Figure 11;

Figure 13 is a perspective view, from the rear, of one of the component parts shown in Figure 11;

Figure 14 is a diagrammatic view showing the relationship of the various layers at the commencement of a winding operation;

Figure 15 is a view similar to Figure 14 illustrating the commencement of the winding operation;

Figure 16 is a view similar to Figure 15 showing the relationship between the strips on the outer surface of the wound body;

Figure 17 is a perspective view of a wound capacitor body; and

Figures 18-24 are a series of diagrammatic views, illustrating successive steps of the present procedure, as carried out by the illustrated apparatus.

I shall first describe the general structural characteristics of the wound body which is produced in accordance with my present invention, and reference is directed to Figures 14–17.

The first step is to produce two composite strips 30 and 31, each of which comprises an insulating and a conducting layer, with the ends of the layers in alignment. In the preferred construction, the conducting layer consists of a single layer of foil or the like, and the insulating layer consists of two superposed plies of paper or the like. Thus, the composite strip 30 is composed of the foil layer 32 and of the two paper layers 33 and 34. Similarly, the composite strip 31 is composed of the foil layer 35, and the two paper layers 36 and 37. Each of these layers is preferably withdrawn from a continuous supply length carried by a suitable supply reel. None of these supply reels has been illustrated, since they are well known per se.

For the sake of convenience, the composite strip 30 will hereinafter be referred to as the "first composite strip," and the composite strip 31 will be referred to as the "second composite strip."

The first step in forming a wound body of the present character is to bring the two composite strips into superposed relationship with the conducting layer of the first composite strip (i. e., the foil 32) in contact with the insulating layer of the second composite strip, as illustrated in Figure 14. At the same time, the end of the composite strip 31 is caused to project longitudinally beyond the end of the composite strip 30.

These superposed and overlapping ends are then brought into suitable engagement with a winding mandrel, and I have illustratively shown the strips engaged between the two parts 38 and 39 of a split mandrel, it being understood that the relative sizes of the elements are exaggerated in each of Figures 14, 15, and 16, to clarify the disclosure.

When the mandrel is rotated in the direction of the arrow 40 (Figure 15), the first thing that happens is that the ends double back upon themselves, as shown in Figure 15, whereby the longer end, i. e., the end of the strip 31, covers over and envelops the shorter end, i. e., the end of the strip 30. A continuation of the mandrel rotation results in coiling the strips in spiral fashion with the first (i. e., the shorter) composite strip on the outside. Since the conducting layer of the first composite strip was initially brought into contact with the insulating layer of the second composite strip, the wound body has an insulating layer on its outer surface, this being the insulating layer of the strip 30.

After a predetermined amount of winding, to form a body of predetermined selected size, the two strips are severed from the sources of supply, and this severance is purposely accomplished in a manner which, again, leaves the first composite strip shorter than the second composite strip. This is best illustrated in Figure 16, in which it will be observed that the outer end of the strip 30 terminates rearwardly of the outer end of the strip 31.

A label or sticker 41 is then applied to the wound body, and after its removal from the mandrel it has an appearance as shown in Figure 17. The winding I have illustrated is of the so-called non-inductive type, i. e., the foil layer 32 projects from one end of the body, while the foil layer 35 projects from the other, this result being achieved by initially arranging the foil layers in laterally-offset relationship, in accordance with well-known practice. This lateral arrangement of the foil is not apparent in Figures 14–16, nor is it material to the unique features of the present invention, and it will be understood that this lateral displacement of the foil layers is an expedient customarily employed in the winding of bodies of the present general character.

A careful study of Figures 15 and 16 will reveal the fact that the two foil layers are mutually insulated, at all points, by a minimum thickness of two plies of paper. This desirable result is accomplished, notwithstanding the fact that the layers of each composite strip have their ends in alignment, and that the two ends of the composite strips at the commencement of the procedure are facing in the same direction, as shown in Figure 14.

Before describing the other features of the apparatus which I have chosen to illustrate herein, attention is directed to Figure 10 which shows the two parts of a preferred type of split mandrel which I employ. The strip-engaging parts 38 and 39, diagrammatically illustrated in Figures 14 and 15, are at the extreme forward ends of the two complementary elements shown in Figure 10. The element on which the part 38 is formed has a rear knob or head 42 from which a shank 43 extends. This shank is of substantially cylindrical contour, except that it has a longitudinal groove or channel 44 on its inner face, and a similar longitudinal channel or key-way 45 on its outer face. The head 42 has a bore through it (indicated in Figure 9 by the reference numeral 46) through which the shank portion 47 of the other mandrel element may pass. The latter element is also provided with a head 48 on which the shank 47 is formed. The shank 47 is so contoured that it will fit snugly and slidably within the channel or groove 44. For a purpose presently to be described, the shank 47 is provided with a depressed portion or recess 47a. When the two elements of the mandrel are together, this depressed portion defines the base of a key-way corresponding to and diametrically opposite the key-way 45.

I have refrained from illustrating the details of the manner in which each shank is assembled with its corresponding head. Thus, in Figure 9, it will be observed that I have shown the shank 47 as an integral part of the head 48, and I have similarly shown the shank 43 as an integral part of the head 42. In actual practice, these parts are best formed of separate pieces permanently secured together during the course of manufacture.

The two mandrel elements are longitudinally shiftable with respect to one another, in well-known manner, to bring the portions 38 and 39 into and out of an opposed cooperating relationship. That is, during the winding procedure, the parts 38 and 39 assume the cooperating relationship shown in Figures 14 and 15, but during the initial threading and the ultimate removal of the wound body, the mandrel elements are adjusted into the relationship shown in Figure 9, the head 48 being withdrawn rearwardly with respect to the head 42.

The present improved apparatus employs two or more split mandrels, and I have chosen to illustrate a construction in which two such mandrels are used. They are mounted in association with a rotatable drum with their axes parallel to but offset from the axis of the drum, and the mandrels are preferably arranged in diametrically opposite relationship. The mode of mounting mandrels in association with the drum is best illustrated in Figures 2, 11 and 12, to which reference is now directed.

The drum is composed of a cylindrical body 49 (Figure 12) and two end walls 50 (Figure 12) and 51 (Figure 11). Passing through the body 49 are two cylindrical tubes 52 and 53 through which the two mandrels extend, respectively.

The drum end 50 is a plate having an annular groove 54 adapted to receive the forward end of the body 49, a series of fastening screws 55 extending through suitable openings 56 into endwise engagement with the body 49. (The holes in the body 49, which receive the screws or fasteners 55, are not visible in Figure 12.)

The plate 50 is also provided with two bores 57 and 58 adapted to receive the ends of the tubes 52 and 53, respectively, thereby affording support for the forward ends of these tubes.

For a purpose hereinafter to be described, the plate 50 is also provided with four similar aligned bores 59, 60, 61 and 62, two of them being arranged on one side of the axis, adjacent to the bore 57, the other two being arranged on the other side of the axis, adjacent to the bore 58.

The rear end wall of the drum (generally designated 51 in Figure 11) is an oddly-shaped element, substantially circular in external contour, and provided with four openings 64 adapted to receive screws or fasteners 65 which engage with openings 266 in the rear end of the drum body 49 (Figure 12). The screws or fasteners 65 secure the rear end plate 51 to the drum body 49 in the same way as the screws or fasteners 55 secure the forward end plate 50 to the drum body 49.

The margin of the member 51 comprises a rear portion 66 having a smooth cylindrical outer surface, and a forward portion 67 of slightly greater diameter and provided with spaced notches 68 adapted to cooperate with actuating and retaining pawls hereinafter to be described.

The rear face of the element 51 has a depressed base 69, and this base in turn is provided with two further depressions or recesses 70 and 71. In the latter recesses there are bores 72 and 73 which are positioned to permit passage therethrough of the tubes 52 and 53, respectively. In each of the recesses 70 and 71 there is also a smaller bore, designated by the reference numerals 74 and 75, serving as bearings for certain pinions hereinafter to be described.

In the depressed base 69, threaded recesses 76 are provided for receiving fastening screws presently to be described.

The drum is journaled, for rotation about its axis, within fixed bearings secured to the table or base upon which the apparatus is mounted. This base is shown most clearly in Figures 1 and 2, being designated by the reference numeral 77. It may assume any convenient shape or form, and the parts which are secured to it may be fastened in any suitable manner. One of the bearings for the drum is an upstanding element 78 within which the forward portion of the drum rotates. The other bearing is a somewhat larger element 79 within which the rear portion of the drum rotates. The element 79 is shown not only in Figures 1 and 2 but also in Figure 11. Its peripheral surface 80 is cylindrical. At predetermined regions it carries substantially radial stops 81 and 82, which are provided respectively with rearwardly extending abutment posts 83 and 84. These posts are preferably secured to the stops 81, 82, respectively, in a removable fashion, e. g., by fitting frictionally into holes formed in these stops for this purpose.

On its rear face, the bearing element 79 carries a retaining pawl 85, urged inwardly by a leaf spring 86, this pawl being intended to engage at predetermined times with the notches 68 on the element 51. The bearing 79 is also provided with a second retaining pawl 87, which faces in the opposite direction and which is offset rearwardly with respect to the pawl 85. The pawl 87 is under the constant urgence of a leaf spring 88, and engages with certain notches presently to be described.

Within the recess defined by the depressed base 69 of the element 51 and the ring portion 66 of this element, there is mounted a ring gear 89 (Figure 11) adapted to rotate about an axis concentric with the drum axis. This ring gear has internal teeth 90, and it is secured to and carried by a notched actuating element 91. The securement of the elements 89 and 91 may be achieved in any desired way, and I have illustratively shown studs or fasteners 92 adapted to pass through suitable openings 93 in the element 91 and to enter threaded recesses 94 in the ring gear.

The element 91 is provided on its peripheral face with a series of notches 95, more closely spaced than the notches 68 on the element 51, and facing in the opposite direction.

The positionally-fixed retaining pawl 87 engages with the notches 95 at predetermined times.

At 96 and 97 (Figure 11) I have shown two mandrels of the type hereinbefore described. The mandrel 96 is mounted within the tube 52, the mandrel 97 within the tube 53. Carried by the mandrel 96 is a pinion 98, and carried by the mandrel 97 is a pinion 99. Each of these pinions is provided with inwardly directed keys which fit, respectively, within the grooves on the opposite sides of each mandrel. Thus, assuming that the mandrel 96 of Figure 11 is the one which is illustrated in Figures 9 and 10, it will be observed that the pinion 98 has a key 100 and an opposed key 101; the key 100 fits into the groove 44 in the region of the recess 47a; the key 101 fits into the groove 46. Accordingly, the pinion 98 rotates with the mandrel at all times, and the mandrel section 39 is nevertheless longitudinally adjustable with respect to the complementary mandrel section 38.

The engagement of the pinion 99 with the mandrel 97 is similar.

The pinion 98 meshes with a planetary pinion 102 which is mounted on a shaft 103. The inner end of this shaft is journaled in the bearing recess 74, while the outer end of this shaft is mounted in a corresponding bearing recess 104 formed in a rear closure plate 105. Mounted on the shaft 103, coaxially with the pinion 102, is the relatively small pinion 106 which meshes with the teeth 90 of the ring gear 89.

Similarly associated with the pinion 99 is the planetary pinion 107 mounted on the shaft 108, this shaft being journaled in the recess 75 and in the rear recess 109. The shaft 108 carries the pinion 110 which meshes with the internal teeth 90 on the ring gear 89.

In assembling the parts, it will be observed that the pinions 98 and 102 form a pair which are accommodated compactly within the recess 70 of the drum end 51; and similarly, the pinions 99 and 107 constitute a pair which are accommodated compactly within the recess 71.

During the completion of the assembly of the various elements, the rear closure plate 105 is secured in position by fasteners or screws 111 passing through openings 112 in the plate 105, and engaging within the recesses 76 of the element 51. The larger bores 113 and 114 in the plate 105 permit the passage therethrough of the rear ends of the mandrels 96 and 97, respectively. Mounted within these bores, it may be desirable to provide sleeve portions 115 and 116 (see Figure 2) which are aligned with the tubes 52 and 53, respectively, and serve to hold the pinions 98 and 99 in position.

Those portions which are secured to and rotate with the drum are the front end plate 50 (Figure 12), the drum body 49, the rear end plate 51 (Figure 11), the closure plate 105, the tubes 52 and 53, the mandrels accommodated within these tubes, and the pinions 98 and 99 mounted on the mandrels, respectively. Those parts which have a relative rotative movement with respect to the drum, but coaxial therewith, are the ring gear 89 and the actuating element 91. Obviously, if the drum is retained against rotation, a rotation of the ring gear 89 will cause rotation of each of the mandrels about its own axis. On the other hand, if the ring gear 89 is retained against rotation, a rotation of the drum in the opposite direction will cause each of the mandrels to continue rotation about its own axis, but will simultaneously cause the mandrels to travel through an arcuate path. This result stems from the fact that the planetary pinions 106 and 110 will ride circumferentially along the gear teeth 90.

To bring about the desired relative rotations of the several parts, I provide a control device which consists of the ring part 117 (Figure 11) and the radially-projecting handle 118. The ring 117 rides freely on the outer cylindrical surface of the portion 66 of the element 51. In its peripheral surface there is a slot 119 adapted to receive the inner tapered end 120 of the handle 118. A pivot pin 121 is caused to extend through a suitable opening 122 in the ring 117, and through an aligned opening 123 in the handle 118. This association of parts permits the handle 118 to be pivoted through a slight arc (compare, e. g., Figures 4 and 5), while the ring 117 guides the major movements of the handle 118 through a circular arc concentric with the drum axis.

On one side of the handle 118, an actuating pawl 124 is pivoted at 125, and is constantly urged by a leaf spring 126 in the direction of a stop pin 127. On the opposite side of the handle 118, there is a similar pawl 128 (Figure 13), but this pawl faces in the opposite direction. It is pivoted at 129 and is constantly urged by a leaf spring 130 toward the stop pin 131. The pawl 124 cooperates with the notches 95 on the element 91; the pawl 128 cooperates with the notches 68 on the element 51.

The handle 118 is provided with a projecting portion 132 intended to afford a convenient hand grip for the operator of the machine. The fixed stops 83 and 84 serve to limit the arcuate movements of the handle 118 to an accurate 180°.

Assuming that the handle 118 is in the position of Figure 5, pressure in the direction of the arrow 133 will cause the pawl 124 to engage with one of the notches 95, and as the handle is moved through 180°, the member 91, along with the ring gear 89, are rotated through a corresponding arc. During this motion, the pawl 128 rides freely over the notches 68, and the retaining pawl 85 engages with one of the notches 68 in order to hold the drum, and the parts associated with it, against rotation. Accordingly, during this 180° movement of the handle (hereinafter referred to as the "forward stroke"), each of the mandrels rotates about its own axis, but retains its relative position with respect to the apparatus as a whole. This "normal" position of the mandrels is that which is shown in Figure 4, wherein it will be observed that they are arranged side by side in a substantially horizontal plane. It will be understood, however, that this "normal" position need not necessarily be in a horizontal plane, and that the mandrels assume this relationship only in the apparatus herein chosen for illustration.

During the return stroke of the handle 118, the pawl 128 swings downwardly into engagement with one of the notches 68, and as the handle 118 returns to the position of Figures 4 and 5, the drum (and the parts carried thereby) rotates through 180° about its own axis. During this rotation, the retaining pawl 87 engages with one of the notches 95 and holds the ring gear 89 against rotation. At the same time, the pawl 124 rides freely over these notches 95.

During the forward stroke of the handle, it may be desirable to postpone the engagement of the pawl 124 with one of the notches 95. In order to control this, I mount an adjustable cam 134 on the peripheral surface 80 of the fixed bearing 79, and I mount a cam follower 135 on the pawl 124 (see Figure 13). The cam 134 is shown most clearly in Figure 12 and consists of a ring having a relatively wide portion 136 and a relatively narrow portion 137. The set screw 138 engages within a threaded opening 139 and bears against the surface 80 whenever the cam 134 is locked in any selected position. As the handle 118 moves through its forward stroke, the pawl 124 will be held away from the notches 95 so long as the cam follower 135 rides along the wide portion 136 of the cam 134. As soon as the follower 135 reaches the sloping shoulder 140, it slides off the cam 134 and allows the spring 126 to press the pawl 124 downwardly into engagement with one of the notches 95.

Before describing the complete operation of the apparatus, it is necessary to refer first to the elements shown in the right-hand portion of Figure 12, and to the auxiliary mechanism shown at the right of Figures 1 and 2.

Projecting forwardly from the drum are four parallel rods 141, 142, 143 and 144, the relationship being the same as that of the openings 59—62 hereinbefore described. In fact, the rods 141—144 have their ends mounted, respectively, in these openings. In order to support these rods, two parallel elements 145 and 146 are provided, the former being fitted against the front face of the drum wall 50, the element 146 being suitably mounted a short distance away. Each of the elements 145 and 146 is provided with external gear teeth; and a jack shaft 147, provided with pinions 148 and 149, meshing with the elements 145 and 146 respectively, causes these elements always to rotate in unison.

The element 145 is provided with openings 150, suitably spaced to receive the rods 141—144. It is also provided with bores 151 and 152 adapted to receive the forward operative ends of the mandrels 96 and 97 respectively.

The element 146 is provided with openings 153 aligned with the openings 150 and adapted to support the forward ends of the rods 141—144. The element 146 is also provided with an S-shaped cutout 154 to permit the passage therethrough, at proper intervals, of certain elements which have to do with the cutting of the strips.

Referring to Figures 1 and 2, it will be observed that the jack shaft 147 is mounted in a fixed bearing 155, and that the gear-like element 146 is mounted in a housing 156. Any other suitable expedient may be employed for supporting these elements, or for rigidifying the four rods 141—144.

Referring now to Figures 1, 2 and 8, it will be observed that the supporting base 77 is provided with an extension rail 157. Slidably mounted on this rail is a carrier 158, intended to be reciprocated in a direction parallel to the drum axis and through a limited distance. An end wall 159 on the carrier 158 may be provided, if desired, to limit the movement of the carrier toward the drum.

The carrier 158 supports two parts of the machine. One is the cutter 160 which is pivoted at 161 to an upstanding wall 162, and is held in an upward inoperative position by means of a tension spring 163, the action of the spring being limited by an abutment 164 against which the back of the cutter normally rests.

The other element supported by the carrier 158 is a T-shaped bracket 165 pivoted at 166 to the wall 162 and to a similar wall 167 slightly spaced therefrom. A leaf spring 168 constantly urges the bracket 165 into the position of Figure 8, in which the stem of the T is slightly inclined to the horizontal. The pivotal mounting of the bracket 165, however, permits this stem to be readily swung into a horizontal plane, for a purpose presently to be described.

The bracket 165, by itself, fulfils no function, but it serves to support two spaced fingers 169 which project in parallel relation toward the drum, and parallel to the drum axis. These fingers are spaced apart by a distance slightly greater than the distance between the rods 141 and 142 or between the rods 143 and 144.

The operation of the machine can best be described by reference to Figures 18–24, each of these figures being a diagrammatic view from what I have termed the front of the machine, i. e., in a direction parallel to the section lines 6—6, 7—7, and 8—8 of Figure 2.

At the side of the apparatus any suitable device or arrangement is provided to serve as a "supply station" for the various layers of foil and paper which enter into the construction of the bodies to be wound. I have shown no supply station, as such, in any of the drawings, but have indicated in Figures 18-24 how a pair of guide rollers 170 and 171 may be arranged in order to feed to the apparatus the two composite strips 30 and 31 (see Figure 14).

In Figure 18 it may be assumed that the mandrel 96 is in its normal position adjacent to the "supply station." This positions the mandrel 97 at a diagrammatically opposite point, with respect to the drum axis. This also brings the rods 141—144 into the positional relationship shown in Figure 18.

With the parts in this relationship, the operating handle 118 is in its "normal" position as indicated in Figures 4 and 5.

The mandrel 96 having been threaded as indicated in Figure 14, the operator swings the handle 118 in a counter-clockwise direction (as indicated in Figures 3, 4 and 5), thus moving it for 180° through its forward stroke. As hereinbefore described, the drum remains stationary during this forward stroke, but each of the mandrels is rotated about its axis. Accordingly, the mandrel 96 will wind the strips upon itself, and at the conclusion of the forward stroke of the handle the parts will be in the relationship shown in Figure 19. This is the same relationship shown in Figure 18 (since the drum has not rotated), but it will be observed that a wound body has been partially formed on the mandrel 96.

The operator then swings the handle 118 through its reverse or return stroke (clockwise as viewed in Figures 3, 4 and 5), as a result of which the parts pass through the relationship of Figure 20 and presently assume the relationship of Figure 21. During this time, the mandrel 96 continues to rotate about its axis, and thus continues to wind the strips into the desired body.

The operator temporarily discontinues the return stroke of the handle 118 when the parts have reached the approximate relationship shown in Figure 21. At this point, he does two things: (a) he retracts half of the split mandrel 97 if this has not been done previously (see Figure 21), and (b) he moves the carrier 158 toward the drum. The knife 160 and the fingers 169 move through the cut-out 154 in the element 146, and these parts assume the positions shown in Figure 22.

The operator then moves the handle 118 to complete its return stroke and thereby bring it back to the position of Figures 4 and 5. This brings the parts into the relationship shown in Figure 23. It will be observed that the rods 143 and 144 have advanced transversely against the second composite strip so as to withdraw an extra length of this strip from the supply station, the rods 143 and 144 serving at the same time to bring a midportion of this extra length into registry with the first composite strip and directly within the range of action of the cutter 160.

The operator then restores the two sections of the mandrel 97 into mutual proximity, thereby engaging within the mandrel the two composite strips 31 and 32, in readiness for a new winding operation.

The operator then actuates the cutter 160 to cut through both strips at the same time and at the same place. As is evident from Figure 23, this cutting takes place directly between the rods 143 and 144.

The carrier 158 is then retracted into the inoperative position of Figure 2, thus withdrawing the cutter 160 and the fingers 169.

The operator then starts the handle 118 on a second forward stroke, and this accomplishes two things: it completes the winding of the first body on the mandrel 96, and it commences the winding of a new body on the mandrel 97 (see Figure 24).

Shortly after the commencement of this forward stroke of the handle, the operator discontinues further movements of the handle, applies a sticker or label to the body which has been wound on mandrel 96, and withdraws the completed wound capacitor body, by first retracting one half, then the other half, of the mandrel. After removal of the capacitor body, he returns the half 38 to winding position but leaves the half 39 retracted.

A resumption of the forward stroke of the handle 118 initiates a repetition of the procedure, the parts then being substantially in the relationships shown in Figure 18, except that the mandrels 96 and 97 have changed places.

It thus becomes apparent that a single operator is enabled very rapidly to produce one wound body after another, these bodies being formed successively on the two mandrels. The cutting action indicated in Figures 22–24 is a relatively simple procedure, and results in forming the desired overlapping of strips not only on the body which is being completed, but also on the new body whose winding is being commenced. More particularly, it will be observed upon reference to Figure 24, that the first composite strip has its outer end shorter than the second composite strip as the winding of the body on the mandrel 96 is completed, thus producing a body as illustrated most clearly in Figure 16. Simultaneously, it will be observed that the first composite strip is shorter than the second composite strip in the region where engagement with the mandrel 97 has been effected, thus establishing the desired relationship indicated in Figure 14.

In the event that it may be desirable, under certain circumstances, to wind a somewhat reduced length upon one of the mandrels, the cam 134 is shifted by a corresponding amount so that, during the forward stroke of the handle 118, the commencement of winding is slightly postponed. The cam has no effect upon the completion of the desired winding, since it is only the pawl 124 which is temporarily held out of action by the cam, and during the return stroke, the pawl 128 remains constantly in engagement with the drum. Accordingly a slight adjustment of the cam 134, which is a very simple thing to do, establishes an adjusted relationship of parts which readily permits a large number of bodies to be successively wound, as hereinbefore described, having a slightly reduced number of turns.

Should it be desirable, under certain circumstances, to wind a body or bodies having a larger number of turns thereon, the abutments 83 and 84 (Figure 11) may be temporarily withdrawn, so that the forward stroke of the handle may continue beyond 180°. Under such circumstances, however, in the machine illustrated, the forward stroke must be increased by increments of 360°, since it is important for a proper operation of the machine that the return stroke (during which the drum is rotated) extend accurately through 180°. If the machine is modified to embody two control handles, one carrying the pawl 124 the other the pawl 128, the forward stroke may be of any desired extent without limitation.

While I have illustrated and described a machine which is intended to be operated by hand, it will be understood that the mechanism readily lends itself to automatic or semi-automatic operation. Thus, a motor or similar motive power may be employed to move the control handle through the desired strokes. Similarly, a mechanism may be provided which automatically discontinues the movements of the control handle at predetermined times, advances the carrier 158, actuates the cutter 160, withdraws the carrier 158, and resumes the movements of the control handle. If desired, some of these procedures may be automatically controlled, others left to manual operation.

It will also be understood that more than two mandrels may be provided for. For example, three mandrels might be used, spaced at 120° intervals. In such an event, the only difference would reside in the provision of a pair of rods (like the pair 141—142 or the pair 143—144) in association with and adjacent to each mandrel. By suitable design of the teeth on the ring gear 90, and of the complementary pinions engaging with this gear, predetermined arcuate movements of the drum, corresponding to the varying numbers of mandrels employed, could readily be provided for.

In general it will be understood that the details herein described and illustrated may obviously be modified in many respects by those skilled in the art without departing from the spirit and scope of the invention as expressed in the appended claims. It is therefore intended that these details, except as they may be specifically referred to in the appended claims, be interpreted as being purely illustrative.

Having thus described my invention and illustrated its use, what I claim as new and desire to secure by Letters Patent is:

1. In the art of forming a capacitor body, the procedure which consists in drawing from a supply station two composite strips each of which comprises an insulating layer and a conducting layer with the ends of said layers in alignment, bringing the ends of said strips into superposed relation, facing in the same direction, with one end projecting longitudinally beyond the other and with the insulating layer of the longer one in contact with the conducting layer of the shorter one, engaging said ends between the complementary parts of a split mandrel, rotating said mandrel in a direction to coil the strips around the mandrel with the short-end strip on the outside, moving said mandrel bodily away from said supply station, engaging the strips in the intervening region between the complementary parts of a second split mandrel, and so severing said strips in the region between said mandrels that one of the ends engaged by said second mandrel will project longitudinally beyond the other, said longer end being on the strip whose insulating layer is in contact with the conducting layer of the other strip, whereby a repetition of the procedure is initiated.

2. In the art of forming a capacitor body, the procedure which consists in drawing from a supply station (a) a first composite strip comprising an insulating layer and a conducting layer with the ends of said layers in alignment, and (b) a second composite strip comprising an insulating layer and a conducting layer with the ends of said layers in alignment, arranging the ends of said strips in superposed relation, facing in the same direction, with the end of said second strip projecting longitudinally beyond the end of said first strip and with the insulating layer of said second strip in contact with the conducting layer of said first strip, bringing said ends into threaded engagement with a mandrel, rotating said mandrel to coil the strips around the mandrel with said first strip on the outside, drawing from the supply station an extra length of said second strip, bringing the strips in the region between the mandrel and supply station into threaded engagement with a second mandrel, and so severing said strips in the region between said mandrels that the new ends engaged by said second mandrel will include a longer end on said second strip, whereby the procedure may be repeated by rotation of said second mandrel.

3. In the art of forming a capacitor body, the procedure which consists in drawing from a supply station (a) a first composite strip comprising an insulating layer and a conducting layer with the ends of said layers in alignment, and (b) a second composite strip comprising an insulating layer and a conducting layer with the ends of said layers in alignment, arranging the ends of said strips in superposed relation, facing in the same direction, with the end of said second strip projecting longitudinally beyond the end of said first strip and with the insulating layer of said second strip in contact with the conducting layer of said first strip, bringing said ends into threaded engagement with a mandrel, rotating said mandrel to coil the strips around the mandrel with said first strip on the outside, moving said mandrel bodily away from said supply station, drawing from the supply station an extra length of said second strip, effecting engagement of the strips in the intervening region with a second mandrel, and so severing said strips in the region between said mandrels that the new ends engaged by said second mandrel will include a portion of said extra length, whereby the coil on the first mandrel will terminate with an extra length of said second strip, and whereby a repetition of the procedure may be initiated by rotation of said second mandrel.

4. In the art of forming a capacitor body, the procedure which consists in drawing from a supply station (a) a first composite strip comprising an insulating layer and a conducting layer with the ends of said layers in alignment, and (b) a second composite strip comprising an insulating layer and a conducting layer with the ends of said layers in alignment, arranging the ends of said strips in superposed relation, facing in the same direction, with the end of said second strip projecting longitudinally beyond the end of said first strip and with the insulating layer of said second strip in contact with the conducting layer of said first strip, bringing said ends into threaded engagement with a mandrel, rotating said mandrel to coil the strips around the mandrel with said first strip on the outside, moving said mandrel bodily away from said supply station, drawing from the supply station an extra length of said second strip, bringing the midportion of said extra length into registry with the first strip, and simultaneously severing both strips at said region of registry, whereby the coil on the first mandrel will terminate with an extra length of said second strip, and whereby a set of new ends of unequal length are available for engagement by a second mandrel for repetition of the procedure.

5. In the art of forming a capacitor body, the procedure which consists in drawing from a supply station (a) a first composite strip comprising an insulating layer and a conducting layer with the ends of said layers in alignment, and (b) a second composite strip comprising an insulating layer and a conducting layer with the ends of said layers in alignment, arranging the ends of said strips in superposed relation, facing in the same direction, with the end of said second strip projecting longitudinally beyond the end of said first strip and with the insulating layer of said second strip in contact with the conducting layer of said first strip, effecting engagement of said ends with a mandrel, rotating said mandrel to coil the strips around the mandrel with said first strip on the outside, moving said mandrel bodily away from said supply station while continuing said rotation, drawing from the supply station an extra length of said second strip and bringing the midportion of said extra length into registry with the first strip in the region between said mandrel and supply station, effecting engagement of the strips with a second mandrel between said supply station and said region of registry, and simultaneously severing both strips at said region of registry, whereby the coil on the first mandrel will terminate with an extra length of said second strip, and whereby a rotation of the second mandrel will initiate a repetition of the procedure.

6. In the art of forming a capacitor body, the procedure which consists in drawing from a supply station (a) a first composite strip comprising an insulating layer and a conducting layer with the ends of said layers in alignment, and (b) a second composite strip comprising an insulating layer and a conducting layer with the ends of said layers in alignment, arranging the ends of said strips in superposed relation, facing in the same direction, with the end of said second strip projecting longitudinally beyond the end of said first strip and with the insulating layer of said second strip in contact with the conducting layer of said first strip, bringing said ends into threaded engagement with a mandrel, directing said strips past a cutting station on their way to said mandrel, engaging both strips in a second mandrel in the region between said cutting station and said supply station after a selected amount has been wound on said first mandrel, simultaneously cutting both strips at said cutting station, and so guiding the strips that, at the time of cutting, the lengths of the second strip from the first mandrel to the cutting station, and from the cutting station to said second mandrel, are greater, respectively, than the corresponding lengths of the first strip.

7. In an apparatus for forming capacitor bodies, a mandrel adapted to engage strips to be wound thereon, a supply station through which said strips are guided on their way to the mandrel, a rotatable drum supporting said mandrel with its axis parallel to but offset from the drum axis, means for rotating said mandrel on its axis, said means comprising a pinion carried by the mandrel and a rotatable ring gear operatively engaging with said pinion and concentrically mounted with respect to the drum axis, and means for rotating said drum on its axis so as to move the mandrel bodily through an arcuate path which successively increases and decreases the distance between said mandrel and said supply station.

8. In an apparatus for forming capacitor bodies, a mandrel adapted to engage strips to be wound thereon, a rotatable drum supporting said mandrel with its axis parallel to but offset from the drum axis, means for rotating said mandrel on its axis, comprising a pinion carried by the mandrel and a rotatable ring gear operatively engaging with said pinion and concentrically mounted with respect to the drum axis, means for rotating said drum on its axis so as to move the mandrel bodily through an arcuate path, means restraining rotation of the ring gear when the drum is rotated in the opposite direction, whereby said mandrel is always rotated in the same direction.

9. In an apparatus for forming capacitor bodies, a mandrel adapted to engage strips to be wound thereon, a rotatable drum supporting said mandrel with its axis parallel to but offset from the drum axis, a control handle mounted for rotation about an axis concentric with the drum axis, and mechanism actuated by said handle, when the latter is rotated in one direction, for rotating the mandrel on its axis, and when the handle is rotated in the opposite direction, for continuing said mandrel rotation and also rotating the drum on its axis to move the mandrel bodily through an arcuate path.

10. In an apparatus for forming capacitor bodies, a mandrel adapted to engage strips to be wound thereon, a rotatable drum supporting said mandrel with its axis parallel to but offset from the drum axis, a control handle mounted for rotation about an axis concentric with the drum axis, and mechanism actuated by said handle, when the latter is rotated in one direction, for rotating the mandrel on its axis, and when the handle is rotated in the opposite direction, for continuing said mandrel rotation and also rotating the drum on its axis to move the mandrel bodily through an arcuate path, said mechanism comprising a pinion carried by the mandrel, a rotatable ring gear concentric with the drum axis and operatively engaging with said pinion, means for effecting engagement between the handle and ring gear when the handle is moved in one direction and between the handle and drum when the handle is moved in the opposite direction, means restraining rotation of the drum when the ring gear is rotated, and means for restraining rotation of the ring gear when the drum is rotated.

11. In an apparatus for forming capacitor bodies, a plurality of mandrels each of which is adapted to engage strips to be wound thereon, a rotatable drum supporting said mandrels with their axes parallel to and radially equidistant from the drum axis, means for rotating said mandrels on their respective axes, comprising a pinion carried by each mandrel and a rotatable ring gear concentric with the drum axis and operatively engaging with said pinions, and means for rotating said drum on its axis so as to move the mandrels bodily through an arcuate path concentric with the drum axis.

12. In an apparatus for forming capacitor bodies, a plurality of mandrels each of which is adapted to engage strips to be wound thereon, a rotatable drum supporting said mandrels with their axes parallel to and radially equidistant from the drum axis, means for rotating said mandrels on their respective axes, comprising a pinion carried by each mandrel and a rotatable ring gear concentric with the drum axis and operatively engaging with said pinions, means for rotating said drum on its axis so as to move the mandrels bodily through an arcuate path concentric with the drum axis, and means for restraining the ring gear when the drum is rotated so that the mandrels continue to rotate during said bodily movements thereof.

13. In an apparatus for forming capacitor bodies, a plurality of mandrels each of which is adapted to engage strips to be wound thereon, a rotatable drum supporting said mandrels with their axes parallel to and radially equidistant from the drum axis, a control handle mounted for rotation about an axis concentric with the drum axis, and mechanism actuated by said handle, when the latter is rotated in one direction, for rotating said mandrels on their respective axes, and when the handle is rotated in the opposite direction, for continuing said mandrel rotations and also rotating the drum on its axis to move the mandrels bodily through an arcuate path concentric with the drum axis.

14. In an apparatus for forming capacitor bodies, a plurality of mandrels each of which is adapted to engage strips to be wound thereon, a rotatable drum supporting said mandrels with their axes parallel to and radially equidistant from the drum axis, a control handle mounted for rotation about an axis concentric with the drum axis, and mechanism actuated by said handle, when the latter is rotated in one direction, for rotating said mandrels on their respective axes, and when the handle is rotated in the opposite direction, for continuing said mandrel rotations and also rotating the drum on its axis to move the mandrels bodily through an arcuate path concentric with the drum axis, said mechanism comprising a pinion carried by each mandrel, a rotatable ring gear concentric with the drum axis and operatively engaging with said pinions, means for effecting engagement between the handle and ring gear when the handle is moved in one direction and between the handle and drum when the handle is moved in the opposite direction, means restraining rotation of the drum when the ring gear is rotated, and means for restraining rotation of the ring gear when the drum is rotated.

15. In an apparatus for forming capacitor bodies, a mandrel adapted to engage strips to be wound thereon, a rotatable drum supporting said mandrel with its axis parallel to but offset from the drum axis, a control handle mounted for rotation about an axis concentric with the drum axis, and mechanism actuated by said handle, when the latter is rotated in one direction, for rotating the mandrel on its axis, and when the handle is rotated in the opposite direction, for continuing said mandrel rotation and also rotating the drum on its axis to move the mandrel bodily through an arcuate path, said mechanism comprising a pinion carried by the mandrel, a rotatable ring gear concentric with the drum axis and operatively engaging with said pinion, means for effecting engagement between the handle and ring gear when the handle is moved in one direction and between the handle and drum when the handle is moved in the opposite direction, and adjustable means for postponing engagement between the handle and ring gear when the handle is moved in said first-named direction.

16. In an apparatus for forming capacitor bodies, a mandrel adapted to engage strips to be wound thereon, a rotatable drum supporting said mandrel with its axis parallel to but offset from the drum axis, a control handle mounted for rotation about an axis concentric with the drum axis, and mechanism actuated by said handle, when the latter is rotated in one direction, for rotating the mandrel on its axis, and when the handle is rotated in the opposite direction, for continuing said mandrel rotation and also rotating the drum on its axis to move the mandrel bodily through an arcuate path, said mechanism comprising a pinion carried by the mandrel, a rotatable ring gear concentric with the drum axis and operatively engaging with said pinion, means for effecting engagement between the handle and ring gear when the handle is moved in one direction and between the handle and drum when the handle is moved in the opposite direction, said means comprising oppositely-facing pawls carried by said handle, and adjustable means for postponing the engagement between the handle and ring gear when the handle is moved in said first-named direction, said postponing means comprising an adjustable cam and a cam follower carried by one of said pawls.

17. In an apparatus for forming capacitor bodies, a mandrel adapted to engage strips to be wound thereon, a supply station from which a pair of said strips emanate, means for rotating the mandrel on its axis to wind a body of selected size, a cutter, and means operable prior to a cutting of the strips for withdrawing from the supply station an extra length of one strip and bringing its midportion into registry with the other strip in the field of action of said cutter, said last-named means comprising a pair of spaced fingers mounted for endwise movement into the space between said strips, and a pair of more closely spaced rods mounted for movement transversely against the outer face of one of the strips in the region between said fingers, said cutter being positioned for severing the registering strip portions between said rods.

18. In an apparatus for forming capacitor bodies, the combination with the elements set forth in claim 17, of a reciprocable carrier supporting said fingers and said cutter.

19. In an apparatus for forming capacitor bodies, the combination with the elements set forth in claim 17, of a rotatable drum supporting said mandrel and said rods with their axes parallel to but on opposite sides of the drum axis.

20. In an apparatus for forming capacitor bodies, the combination with the elements set forth in claim 17, of a rotatable drum supporting said mandrel and said rods with their axes parallel to but on opposite sides of the drum axis, and a reciprocable carrier supporting said fingers and mounted for reciprocation parallel to the drum axis.

21. In an apparatus for forming capacitor bodies, the combination with the elements set forth in claim 17, of a reciprocable carrier mounted for reciprocation parallel to the mandrel axis, and yieldably resilient means for supporting said fingers thereon.

ERNST A. NORDBERG.

REFERENCES CITED

The following references are of record in the file of this patent:

UNITED STATES PATENTS

| Number | Name | Date |
| --- | --- | --- |
| 728,780 | Splitdorf | May 19, 1909 |
| 1,303,325 | James | May 13, 1919 |
| 1,641,389 | Kroeger | Sept. 6, 1927 |
| 2,333,570 | Hild | Nov. 2, 1943 |
| 2,340,340 | Nordberg | Feb. 1, 1944 |
| 2,384,983 | Weiss | Sept. 18, 1945 |